United States Patent
Derscheid

(10) Patent No.: US 8,353,148 B2
(45) Date of Patent: Jan. 15, 2013

(54) METHOD OF CROP PICKUP FLOATING

(75) Inventor: Daniel E. Derscheid, Hedrick, IA (US)

(73) Assignee: Deere & Company, Moline, IL (US)

(\*) Notice: Subject to any disclaimer, the term of this patent is extended or adjusted under 35 U.S.C. 154(b) by 299 days.

(21) Appl. No.: 12/703,463

(22) Filed: Feb. 10, 2010

(65) Prior Publication Data

US 2011/0192130 A1    Aug. 11, 2011

(51) Int. Cl.
*A01D 34/00* (2006.01)
(52) U.S. Cl. .......................................... 56/15.8; 56/341
(58) Field of Classification Search .................. 56/15.8, 56/341, 364, 158
See application file for complete search history.

(56) References Cited

U.S. PATENT DOCUMENTS

| | | | | |
|---|---|---|---|---|
| 2,517,413 A | * | 8/1950 | Pearson | 56/364 |
| 2,524,196 A | * | 10/1950 | Hyman | 56/364 |
| 4,803,832 A | * | 2/1989 | Crawford | 56/341 |
| 5,394,682 A | | 3/1995 | Frimml et al. | |
| 5,813,204 A | * | 9/1998 | Pecenka et al. | 56/341 |
| 6,601,375 B1 | * | 8/2003 | Grahl et al. | 56/16.6 |
| 6,651,418 B1 | * | 11/2003 | McClure et al. | 56/341 |
| 6,679,042 B1 | * | 1/2004 | Schrag et al. | 56/341 |
| 7,204,074 B2 | * | 4/2007 | Bandstra et al. | 56/341 |
| 7,448,196 B2 | * | 11/2008 | Schrag et al. | 56/341 |
| 7,654,069 B1 | * | 2/2010 | Dunham et al. | 56/190 |
| 8,096,102 B2 | * | 1/2012 | Smith | 56/364 |
| 2006/0089223 A1 | * | 4/2006 | Van Vooren et al. | 474/133 |

\* cited by examiner

*Primary Examiner* — Arpad Fabian-Kovacs

(57) ABSTRACT

A method of responding to obstacles encountered by a harvesting pickup apparatus that moves in the harvesting direction, the method including the steps of driving a pickup reel, pivoting at least one structural member, and positioning a path of continuous loop device. The driving of a pickup reel step includes driving the reel with a continuous loop device about a first axis. The pivoting step includes pivoting the at least one structural member about a second axis, the pickup reel being supported by the structural member. The positioning step includes positioning a path of the continuous loop device so that a tight side of the device is located in the harvesting direction from both the first axis and the second axis. This step also includes configuring the harvesting pickup apparatus so that the structural member is pivoted about the second axis in a generally upward direction when the harvesting pickup apparatus encounters an obstacle.

18 Claims, 4 Drawing Sheets ent of the pickup mechanism of the present invention.

METHOD OF CROP PICKUP FLOATING

BACKGROUND OF THE INVENTION

1. Field of the Invention

The present invention relates to crop pickup devices, and, more particularly, to a crop pickup method and device for a baler.

2. Description of the Related Art

Although balers can be self-propelled, a common configuration is for a baler to be towed behind a tractor, the baler being supplied power by way of the tractor power-take-off unit. Balers are often characterized as round balers or square balers. Square balers typically have a plunging mechanism that takes the crop that is picked up, cuts and compresses the crop material into a square bale that is then tied with two strands of twine. Round balers use a crop pickup device to direct the hay to belts that are moving, causing the hay to form in a substantially cylindrical bale. Once the round bale is formed, it is often wrapped in a mesh or film or even wrapped with a winding of twine.

The pickup mechanism of a baler typically has a rotating pickup reel having pickup teeth or tines that pickup the crop that is in a windrow. The rotating tines rotate about an axis where the tines beneath the axis are moving in the direction that the baler is being propelled so that the tines get under and lift up the crop material and deliver it to another section that further moves the harvested crop.

When obstacles are encountered by the tines of the pickup reel, it can result in damage to the tines and/or the drive mechanism. For example, a pickup reel with stiff teeth, such as those illustrated in U.S. Pat. No. 5,394,682 need to be moved so that they are not damaged when encountering an obstacle. One previous solution includes floating springs and another solution involves a hydraulic float that can be utilized to reduce damage, each allowing the pickup assembly to lift in reaction to the force of the teeth contacting the ground or an object, such as a rock. There is a negative consequence from using these types of solutions in that the pickup head typically will bounce up and down in response to an obstacle, causing crop material to be missed in the field. This negative consequence is amplified as baling speeds increase.

What is needed in the art is a method and an apparatus to quickly respond to an obstacle yet eliminate the negative bounce consequence of previous solutions.

SUMMARY OF THE INVENTION

The present invention relates to a mechanically driven assembly that is configured to move the pickup assembly when the pickup assembly encounters an obstacle that increases the drive torque beyond a predetermined level.

The invention in one form is directed to a method of responding to obstacles encountered by a harvesting pickup apparatus that moves in the harvesting direction, the method including the steps of driving a pickup reel, pivoting at least one structural member, and positioning a path of continuous loop device. The driving of a pickup reel step includes driving the reel with a continuous loop device about a first axis. The pivoting step includes pivoting the at least one structural member about a second axis, the pickup reel being supported by the structural member. The positioning step includes positioning a path of the continuous loop device so that a tight side of the device is located in the harvesting direction from both the first axis and the second axis. This step also includes configuring the harvesting pickup apparatus so that the structural member is pivoted about the second axis in a generally upward direction when the harvesting pickup apparatus encounters an obstacle.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
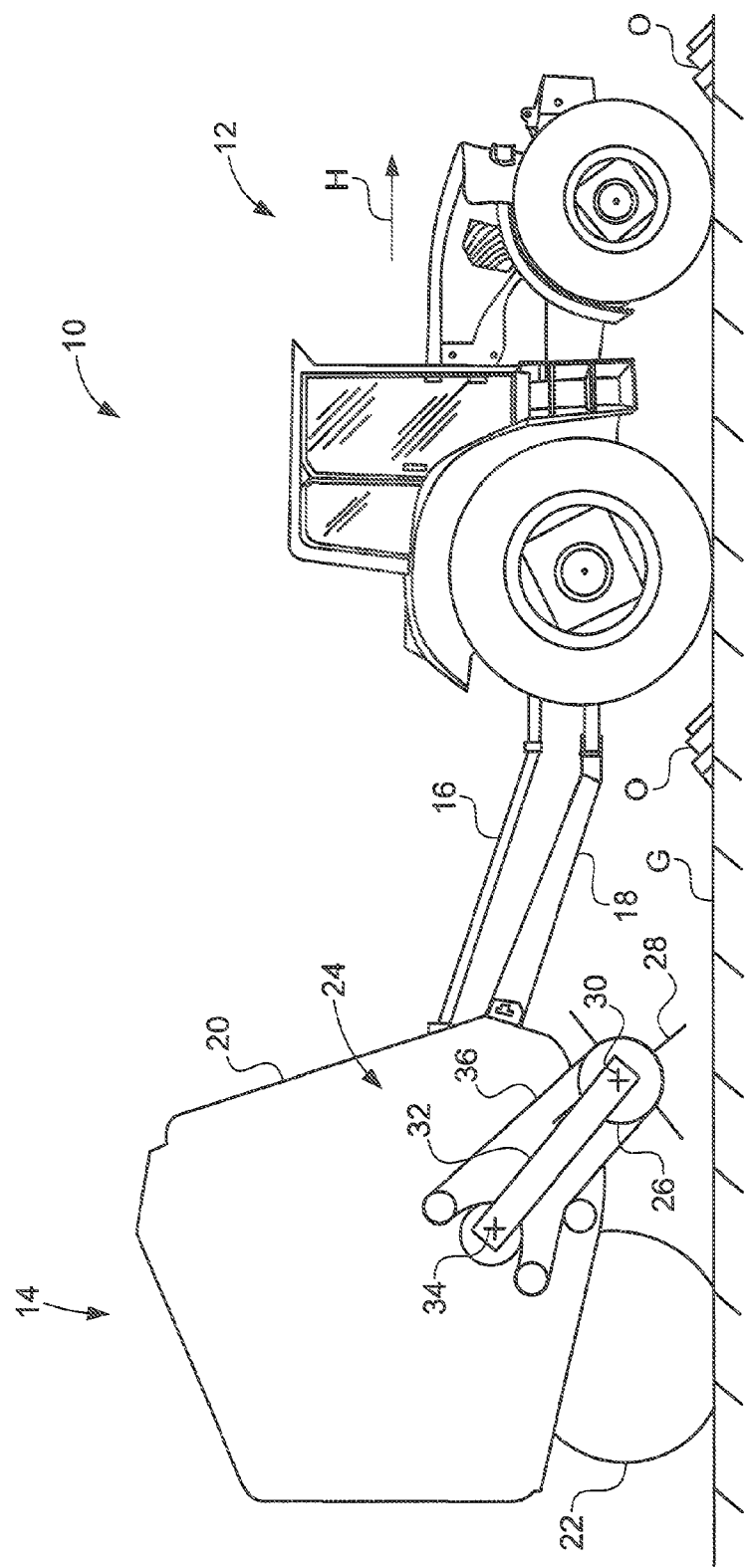
FIG. 1 is a side, somewhat schematical, view of a baler system being towed by a tractor, the baler utilizing an embodiment of the pickup apparatus of the present invention.

Referring now to the drawings, and more particularly to FIG. 1, there is shown an agricultural baling system 10 including a tractor 12 with baler 14 that is driven by a power-take-off (PTO) shaft 16. A tow bar 18 is connected between tractor 12 and baler 14 to allow tractor 12 to pull baler 14 over ground G. Although baler 14 is illustrated as a round baler, the present invention may be utilized on other types of balers and crop pickup devices other than balers and for other crop pickup products other than hay and straw.

Baler 14 includes a chassis 20 that is supported by a wheel suspension system 22 and baler 14 includes a pickup apparatus 24. Pickup apparatus 24 encounters crop that is distributed upon ground G, which may be in a windrow, and conveys the crop material to another portion of the agricultural equipment.

Pickup apparatus 24 includes a reel 26 having tines or teeth 28 thereon, reel 26 rotates about reel axis 30. Pickup apparatus 24 further includes a pickup arm 32 that pivots about a pivot axis 34, causing reel 26 to be lifted away from obstacle O when the drive torque, provided by way of a chain 36, exceeds a predetermined amount.

Figure 2:
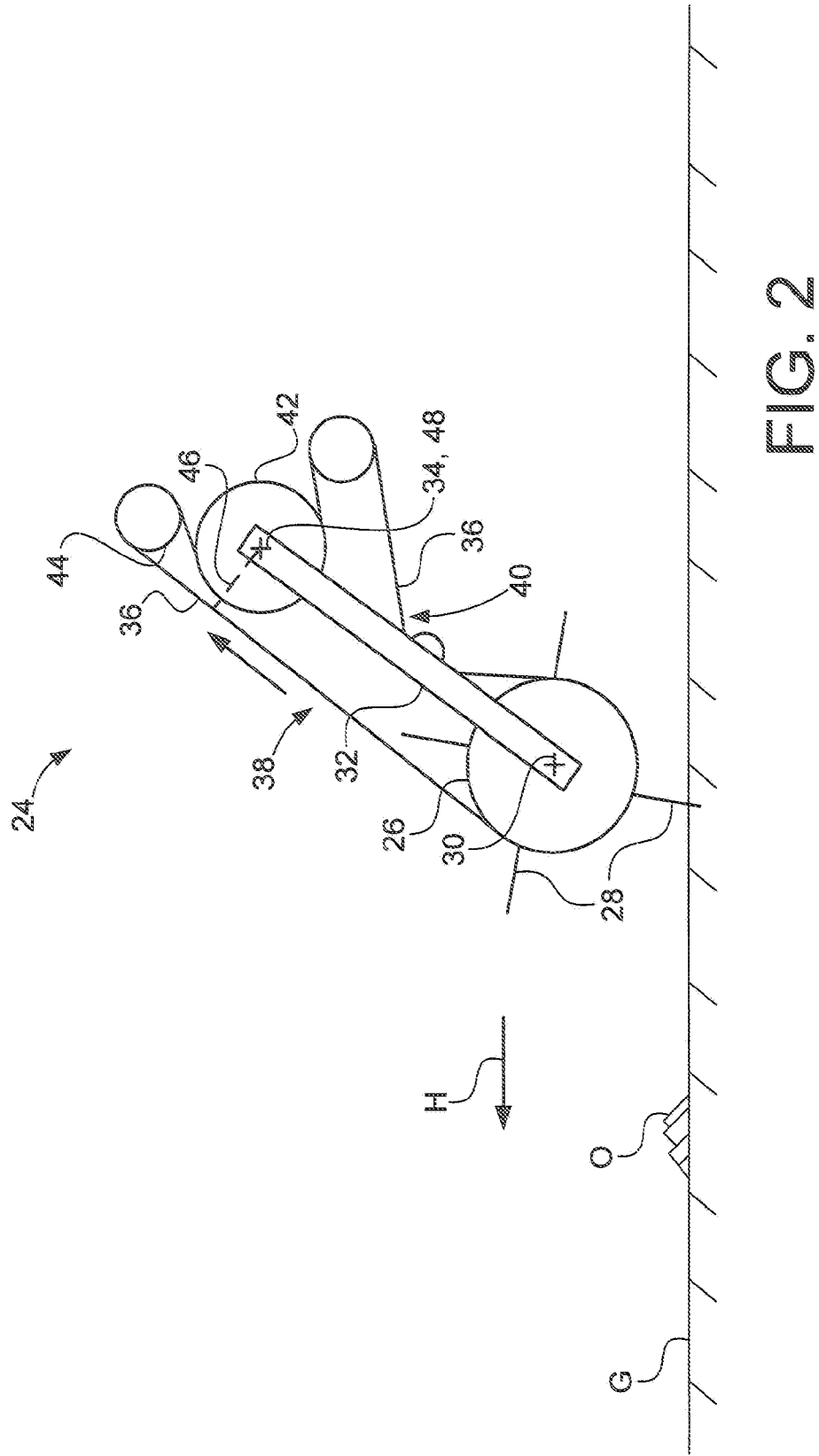
FIG. 2 is a schematical representation of an embodiment of the pickup mechanism of the present invention.

Now, additionally referring to FIG. 2, there is shown a schematical view of an embodiment of the pickup mechanism of the present invention. As baling system 10 moves in a harvesting direction H, reel 26 is driven by chain 36 causing tension side 38 of chain 36 to be tight while slack side 40 is under substantially less tension and is part of the continuous loop of chain 36. Pickup apparatus 24 includes a drive sprocket 42 also known as a rotational guide 42 and chain 36 travels around drive sprocket 42 as well as around idler sprocket 44. The combination of idler sprocket 44 and drive sprocket 42, which is rotating about a drive axis 48, causes there to be a lever arm 46 which causes an upward bias on pickup arm 32. As baler 14 travels along ground G, tines 28 may encounter ground G and additionally obstacle O. As pickup teeth 28 encounter resistance added by obstacle O and/or ground G, pickup apparatus 24 is configured such that torque provided by the force on tensioned side 38 and on the selected length of lever arm 46 relative to reel 26, causes reel 26 to be moved in a generally upward direction as pickup arm 32 pivots about pivot axis 34. The torque required to rotate reel 26 is the normal crop pickup resistance and is considered as part of the configuration to position lever arm 46 so that a proper amount of torque is available to pick up pickup arm 32 when an obstacle O is encountered. Since this is a mechanical reaction to a mechanical encounter and there being no damping or active control systems involved, the movement of pickup arm 32 is such that, as soon as the torque is reduced, pickup arm 32 descends in a generally downward direction as pickup arm 32 pivots about pivot axis 34. Idler sprocket 44 may additionally be adjustable so that it effectively changes the length of lever arm 46 to thereby increase or decrease the upward torque available to move pickup arm 32 away from an obstacle O.

The method used to configure the pickup apparatus 24 includes driving reel 26 with chain 36 about reel axis 30. The structural member illustrated as pickup arm 32 is pivotable about pivot axis 34 and pickup arm 32 supports reel 26. The path of chain 36 is configured with tensioned side 38 in harvesting direction H relative to both reel axis 30 as well as pivot axis 34. The weight of reel 26 as well as pickup arm 32 serve to coact with the selected torque and lever arm so that when a particular resistance is encountered by teeth 28, pickup arm 32 is pulled generally upwardly away from ground G.

Figure 3:
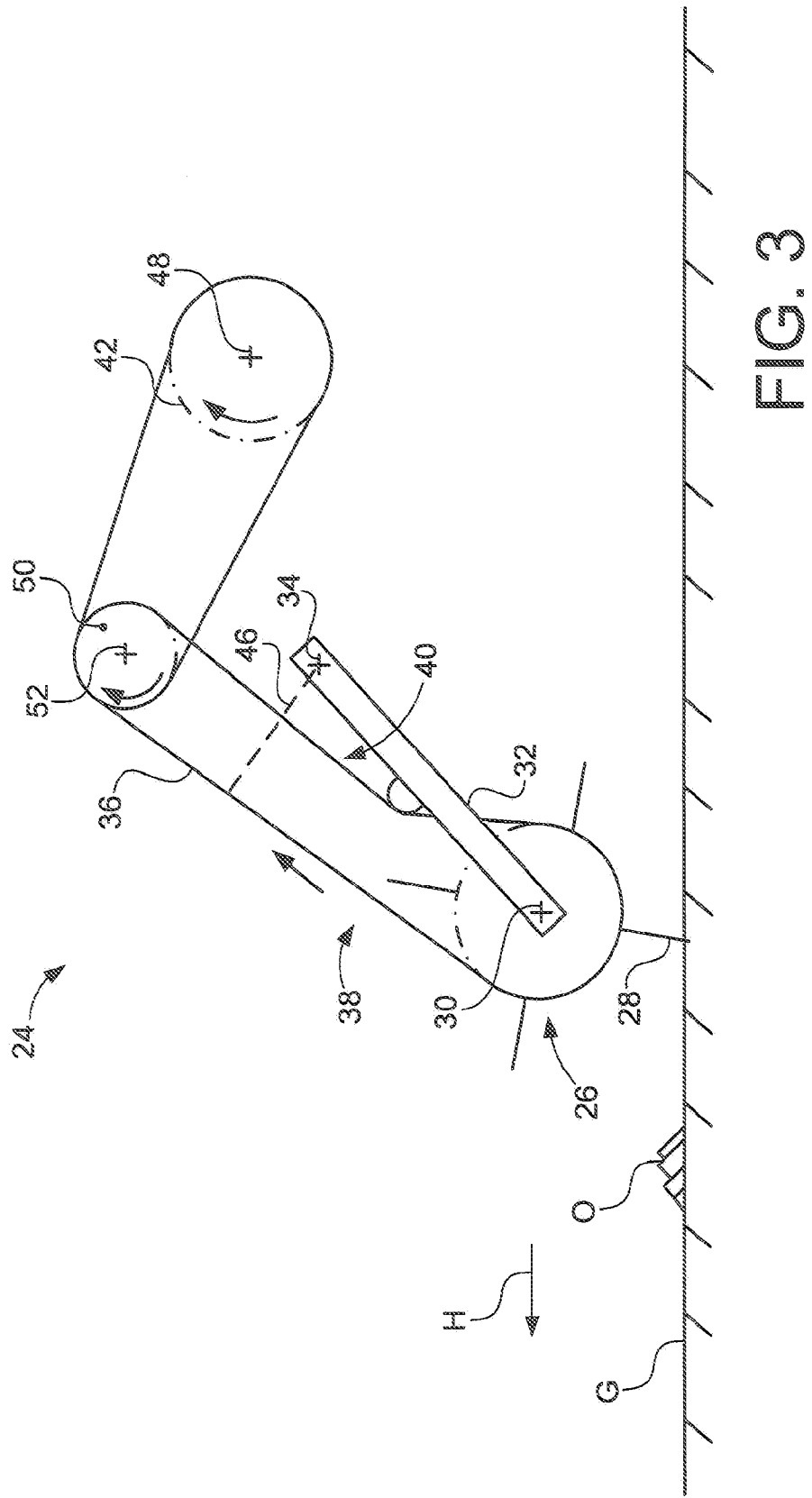
FIG. 3 is another schematical view of another embodiment of the pickup mechanism of the present invention.

Now, additionally referring to FIG. 3, there is illustrated another embodiment of the present invention having several similar attributes. However, in FIG. 3, chain 36 travels about a double idler sprocket 50, which rotates about a rotational axis 52. Rotational axis 52 in this embodiment is not coaxial with pivot axis 34 as was the case in the previous embodiment. Here, drive sprocket 42 drives a separate continuous loop, such as a chain, to drive double idler sprocket 50, which then transfers torque to chain 36. Here again, as pickup apparatus 24 encounters obstacle O, the torque reflected into the system, once it exceeds a predetermined value, causes pickup arm 32 to move in a generally upward direction pivoting about pickup pivot axis 32 similar to the manner previously illustrated. Here, the positioning of rotational axis 52 is above pivot axis 34 and reel axis 30. Additionally, rotational axis 52 may be adjustable to thereby-effectively alter the length of lever arm 46 to thereby adjust the sensitivity of pickup apparatus 24 to the encountering of an obstacle O.

Figure 4:
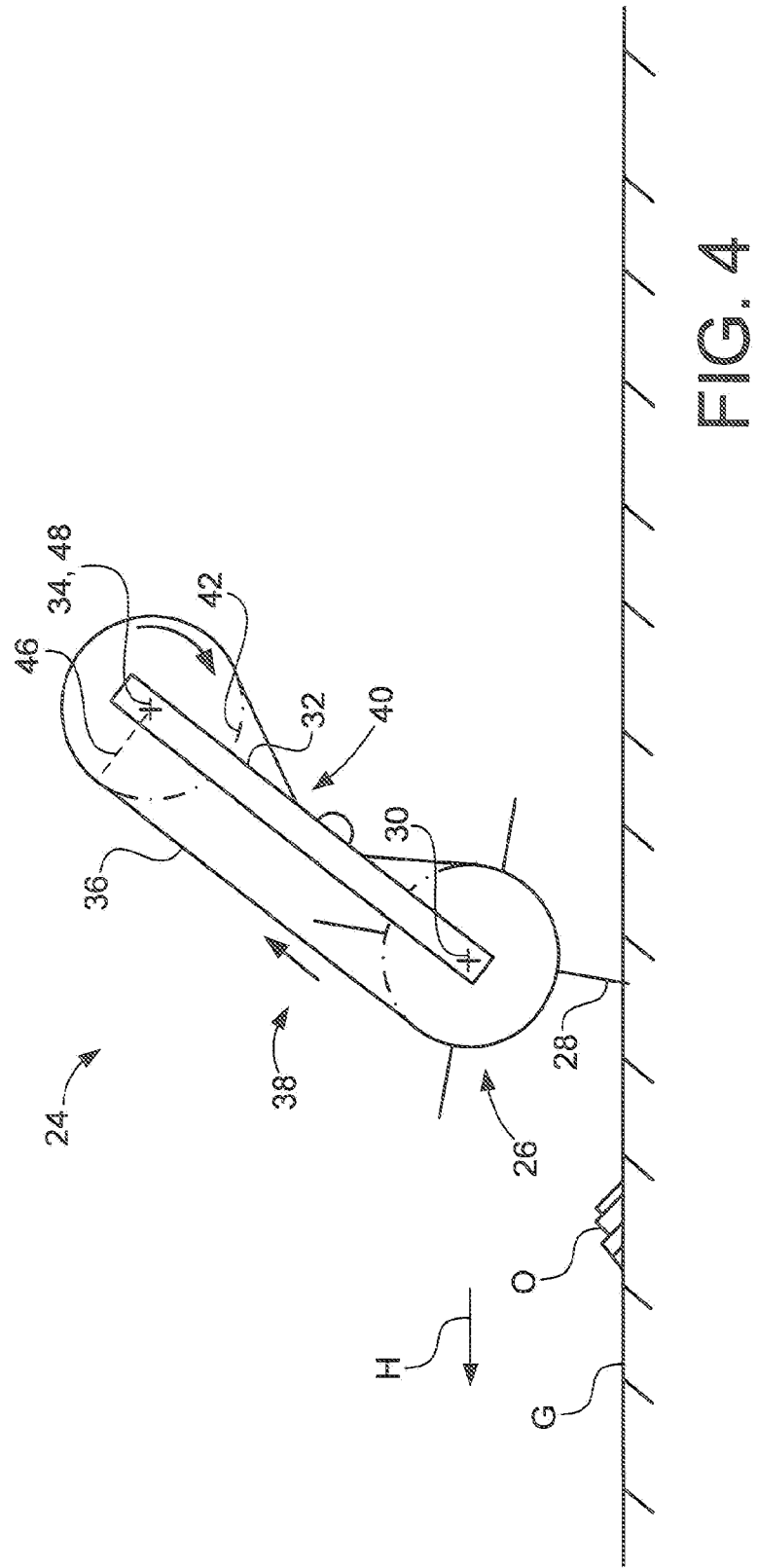
FIG. 4 is yet another schematical view of another embodiment of the pickup mechanism of the present invention.

Now, additionally referring to FIG. 4, there is illustrated another embodiment of the present invention in a schematical form. In this embodiment drive sprocket 42 is located such that drive axis 48 is coaxial with pivot axis 34. Here the diameter of drive sprocket 42 establishes the length of lever arm 46 and thus the amount of force that is applied to result in the amount of torque necessary to move pickup arm 32 in a generally upward direction when teeth 28 encounter obstacle O. In this embodiment, lever arm 46 is defined by the diameter of drive sprocket 42 and may be adjustable by changing the diameter of drive sprocket 42.

The present invention utilizes mechanical drive chain 36 to lift up reel 26 quickly due to the increase in torque in the drive system as teeth 28 encounter ground G or obstacles O in the field. Tensioned side 38 is positioned to have a substantially large lever arm above pivot axis 34 to allow lifting of the weight of pickup apparatus 24. For example, the pickup lift weight may equal 200 pounds and, if lever arm 46 is one foot, then pickup apparatus 24 will lift reel 26 when the needed driving torque of teeth 28 exceeds 200 foot-pounds. Driving sprocket 42 or the position of the idler arrangement on tensioned side 38, which serve to define the length of lever arm 46 in the various embodiments, is fixed to a stationary portion of chassis 20 and does not move when the generally upward motion of pickup arm 32 as pickup apparatus 24 is lifted. The maximum force of the chain lift is limited by the flexure of teeth 28, a clutch that may be positioned in the drive system, not shown, or a sheer bolt or other torque limiting device. Lever arm 46, while in the above example is one foot, the length of lever arm 46 is preferably at least four inches, or alternatively at least 12 inches.

While three possible configurations are shown, which variously include a reversing idler positioned above pivot axis 34, a large diameter sprocket coaxially located with pivot axis 34, and a double idler position in front of and above pivot axis 34, other configurations are also contemplated.

The present invention allows the pickup to raise up over obstacles O or uneven ground G when pickup teeth 28 contact them. Also, pickup arm 32 moves down quickly when the obstacle is passed. At normal baling loads, chain 36 does not lift up pickup arm 32 to thereby prevent pickup bouncing in rough terrain. Advantageously, the present invention is configured such that no additional part count is required to assist with the float since the float of the pickup head is configured to utilize the drive system for the dual purpose of driving reel 26 as well as the pickup float function.

Although not shown, hydraulic or other actuators may be utilized to pick up reel 26 when so commanded by an operator in tractor 12. However, the functioning of pickup apparatus 24 when operating as described above is accomplished without the interaction of hydraulic cylinders, for example, the hydraulic cylinder may define a lower boundary for the movement of pickup arm 32 with pickup arm 32 not being influenced by the hydraulic cylinder during operation. Additionally, the present invention accomplishes the dual purpose of relocating the reel to go over obstacles on the ground and driving the reel due to the configuration of the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of responding to obstacles encountered by an agricultural harvesting pickup apparatus that moves in a harvesting direction, the method comprising the steps of:
   driving a pickup reel with a continuous loop device, said pickup reel rotatable about a first axis;
   pivoting at least one structural member about a second axis, said pickup reel being supported by said at least one structural member; and
   positioning a path of said continuous loop device so that a tight side of said device is located in the harvesting direction from both said first axis and said second axis, said positioning step including a step of selecting a lever arm of a rotational guide about which said continuous loop device travels to thereby determine an encountered torque limit above which said at least one structural member is pivoted upwardly about said second axis when the harvesting pickup apparatus encounters an obstacle.

2. The method of claim 1, wherein said rotational guide has a rotational axis located higher than said first axis.

3. The method of claim 2, wherein said encountered torque limit is at least 200 foot-pounds.

4. The method of claim 3, wherein said lever arm is at least four inches.

5. The method of claim 2, wherein said rotational guide is an idler with said rotational axis being positioned higher than said second axis.

6. The method of claim 2, wherein said rotational guide is a sprocket, said rotational axis being coaxial with said second axis.

7. The method of claim 2, wherein said rotational guide is a double idler sprocket, said rotational axis being positioned higher than said second axis.

8. The method of claim 1, wherein said rotational guide is not moved higher when said at least one structural member pivots about said second axis.

9. The method of claim 1, wherein said continuous loop device is a linked chain.

10. A method of responding to obstacles encountered by a harvesting pickup apparatus of an agricultural baler that moves in a harvesting direction, the method comprising the steps of:
   rotating a pickup reel about a first axis by way of a continuous loop device, said continuous loop device having a tensioned side;
   pivoting at least one structural member connected to the baler about a second axis, said pickup reel being supported by said at least one structural member; and
   positioning said tensioned side of said continuous loop device in the harvesting direction from both said first axis and said second axis, said positioning step including a step of selecting a lever arm of a rotational guide about which said continuous loop device travels to thereby determine an encountered torque limit above which said at least one structural member is pivoted upwardly about said second axis when the harvesting pickup apparatus encounters an obstacle.

11. The method of claim 10, wherein said rotational guide has a rotational axis located higher than said first axis.

12. The method of claim 11, wherein said encountered torque limit is at least 200 foot-pounds.

13. The method of claim 12, wherein said lever arm is at least four inches.

14. The method of claim 11, wherein said rotational guide is an idler with said rotational axis being positioned higher than said second axis.

15. The method of claim 11, wherein said rotational guide is a sprocket, said rotational axis being coaxial with said second axis.

16. The method of claim 11, wherein said rotational guide is a double idler sprocket, said rotational axis being positioned higher than said second axis.

17. The method of claim 10, wherein said rotational guide is not moved higher when said at least one structural member pivots about said second axis.

18. The method of claim 10, wherein said continuous loop device is a linked chain.

\* \* \* \* \*